US006543830B1

United States Patent
Stuck (10) Patent No.: US 6,543,830 B1
(45) Date of Patent: Apr. 8, 2003

(54) ATV CAB ASSEMBLY

(75) Inventor: Andrew G. Stuck, Appleton, WI (US)

(73) Assignee: ATV Cabs, LLC, Appleton, WI (US)

( * ) Notice: Subject to any disclaimer, the term of this patent is extended or adjusted under 35 U.S.C. 154(b) by 0 days.

(21) Appl. No.: 10/109,307

(22) Filed: Mar. 28, 2002

(51) Int. Cl.[7] .................................................. B60J 7/10
(52) U.S. Cl. ..................................................... 296/77.1
(58) Field of Search ............................... 296/77.1, 102, 296/148, 149, 151, 79, 80, 81, 82, 83, 104, 105; 135/88.01, 88.15

(56) References Cited

U.S. PATENT DOCUMENTS

| 4,739,853 | A | | 4/1988 | Ogilvie |
|---|---|---|---|---|
| 4,950,017 | A | | 8/1990 | Norton |
| 4,973,082 | A | | 11/1990 | Kincheloe |
| 5,174,622 | A | | 12/1992 | Gutta |
| 5,203,601 | A | | 4/1993 | Guillot |
| 5,509,717 | A | | 4/1996 | Martin |
| 5,961,175 | A | | 10/1999 | Clardy, Jr. |
| 6,206,446 | B1 | | 3/2001 | Slayden |
| 6,402,220 | B2 | * | 6/2002 | Allen ........................ 296/77.1 |
| 2002/0089207 | A1 | * | 7/2002 | Bayerle et al. ............ 296/77.1 |

* cited by examiner

Primary Examiner—D. Glenn Dayoan
Assistant Examiner—Jason Morrow
(74) Attorney, Agent, or Firm—Andrus, Sceales, Starke & Sawall, LLP (57) ABSTRACT

A removable cab assembly is provided for an all terrain vehicle which has front and rear racks, front and rear wheels provided with respective front and rear fenders and the seat located between the front and rear wheels. The cab assembly includes a front mounting bracket structure attached to a front rack of the all terrain vehicle, and a rear mounting bracket structure removably attached to a rear rack of the all terrain vehicle. A flexible framework has front ends connected to the front mounting bracket structure, and rear ends attached to the rear mounting bracket structure. The framework has a length such that when joined to the front and rear racks, the framework is bendable and assumes a generally semi-circular profile extending above the all terrain vehicle. A flexible fabric cover having longitudinal side edges, a front window and a rear window is removably connected to the framework and to the front and rear racks. Side doors with side windows are removably connected along the entire length of the fabric cover longitudinal side edges and between the front and rear wheels. The attachment of the fabric cover and the side doors of the flexible framework enables a driver seated in the all terrain vehicle to have complete comfort and protection from the outside elements.

16 Claims, 7 Drawing Sheets

ATV CAB ASSEMBLY

FIELD OF THE INVENTION

This invention relates generally to the field of accessories for recreational vehicles and, more particularly, pertains to a removable cab assembly for an all terrain vehicle.

BACKGROUND OF THE INVENTION

All terrain vehicles (ATVs) have become increasingly popular in recent years as recreational vehicles, and are now also being recognized as utility vehicles. These ATVs are able to traverse all terrains including roadways, countryside hills and even mountain pathways. All terrain vehicles generally include two front and rear wheels with transmission and drive components connected to a centrally mounted motor to at least drive the rear wheels, and in some cases, all four wheels. A body shell covers a subframe of the vehicle and has a seat area straddling the motor. The body shell spreads laterally to define front and rear fenders at least partially covering the front and rear wheels. Typically, front and rear equipment carrying racks are disposed over front and rear portions of the body shell.

As ATVs have been exposed more and more to inclement weather conditions, various removable cabs, roll cages and fabric covers have been proposed in an effort to provide an expanded amount of protection and comfort for all users.

By way of example, U.S. Pat. No. 4,950,017 to Norton discloses a kit which provides a removable top assembly for all terrain vehicles, and the assembled top thereof. U.S. Pat. No. 4,973,082 to Kincheloe discloses a rigid roll cage with a fabric cover attached thereto which partially protects the ATV driver. U.S. Pat. No. 5,174,622 to Gutta discloses a combination rigid roll cage and cover for all terrain vehicles. U.S. Pat. No. 5,203,601 to Guillot discloses a rigid frame and flexible cover for recreational vehicles. U.S. Pat. No. 5,509,717 to Martin discloses an all terrain vehicle enclosure having a rigid, peripheral, skeletal portion and a rigid skin attached thereto. U.S. Pat. No. 6,206,446 to Slayden discloses an ATV all weather cab comprised of a rigid frame having built in windows surrounding the driver.

The aforementioned patents do not describe an all terrain vehicle protective enclosure in kit form having a completely flexible framework which, when assembled, provides a curved profile that prevents the accumulation of snow, rain, ice, branches or the like on top of the vehicle. The aforementioned patents also do not describe a flexible fabric cover and side door structure which are enhanced to provide further comfort and convenience features inside and outside of the enclosure for the benefit of the ATV driver. The aforementioned patents further do not describe a means of ventilating the enclosure through a front window and a side window thereof.

Accordingly, it is desirable to provide a portable, removable cab assembly adaptable to the majority of all terrain vehicles having the aforedescribed features absent from the known prior art.

SUMMARY OF THE INVENTION

It is a general object of the present invention to provide an all terrain vehicle enclosure for the purpose of shielding a driver and his/her all terrain vehicle from adverse conditions.

It is one object of the present invention to provide a removable cab assembly for an all terrain vehicle in kit form such that the cab assembly may be easily assembled and disassembled on a variety of ATVs.

It is also an object of the present invention to provide a removable cab assembly having a curved roof portion and a transverse member which provides back support for an ATV driver.

It is a further object of the present invention to provide a removable cab assembly having a flexible fabric cover which is detachably yet securely attached to the flexible framework.

It is an additional object of the present invention to provide a removable cab assembly having twin side doors which are removably attached by zippers along substantially the entire length of the fabric cover to enable exit/entry relative to the cab assembly and to permit side ventilation.

It is another object of the present invention to provide a method of ventilating a removable cab assembly on an all terrain vehicle.

In one aspect of the invention, a kit provides a portable, removable cab assembly for an all terrain vehicle having front and rear equipment carrying racks, a head lamp and front and rear wheels provided with respective front and rear fenders. The kit includes a front mounting bracket structure adapted to be attached by a front clamping arrangement to the front equipment carrying rack. A rear mounting bracket structure is adapted to be attached by a rear clamping arrangement to the rear equipment carrying rack. A flexible framework includes a pair of front, flexible longitudinal frame members adapted to be removably interconnected by a front, flexible transverse member, and a pair of rear, flexible longitudinal frame members adapted to be removably interconnected by a rear, flexible transverse member. Each of the front and rear longitudinal frame members has respective front and rear ends. The front ends of the front longitudinal frame members are adapted to be removably connected to the front mounting bracket structure. The rear ends of the rear longitudinal frame members are adapted to be removably connected to the rear mounting bracket structure. The rear ends of the front longitudinal frame members are adapted to be removably joined to the front ends of the rear longitudinal frame members. The framework is adapted to assume a curved profile extending above the vehicle when interconnected to the front and rear mounting bracket structures.

A flexible fabric cover has longitudinal portions adapted to be removably attached to the front and rear longitudinal frame members. The front edge of the fabric cover is adapted to be removably attached to the front equipment carrying rack, and a rear edge of the fabric cover is adapted to be removably secured to the rear equipment carrying rack. The fabric cover also has longitudinal side edges provided with first slide tracks substantially along their entire lengths. The fabric cover is integrally formed with a front window and a rear window as well as interior and exterior pockets located beneath the rear window. A pair of side doors is adapted to be removably connected to the fabric cover. Each side door has a generally semi-circular upper section including a side window formed therein and forward and rearward pockets disposed beneath the side windows. Each upper window has a periphery provided with a second slide track and zipper structure adapted to engage the first slide track on one of the fabric cover longitudinal side edges. Each side door also has a generally trapezoidal lower section having an edge adapted to be removably secured to the front fender. A deflector shield is adapted to be removably connected to the front equipment carrying rack for directing outside air to an interior face of the front window. The front mounting bracket structure includes a central, V-shaped, tubular base having opposed ends, and a pair of front upright support posts, each adapted to be connected to one end of the base. The rear mounting bracket structure includes a central, curved, C-shaped base having opposed ends, and a pair of rear upright support posts, each being adapted to be connected to one end of the base. The front and rear longitudinal frame members and the front and rear transverse members are constructed of resilient, plastic material. The longitudinal side portions of the fabric cover are provided with hook and loops straps adapted to be engaged with the front and rear longitudinal frame members. The front and rear edges of the fabric cover are provided with hook and loop straps adapted to be engaged with the front and rear equipment carrying racks, respectively. The forward pockets on the side doors are located on exterior surfaces thereof, and rearward pockets on the side doors are located on exterior and interior surfaces thereof. The pockets on the fabric cover and the pockets on the side doors are provided with flaps to normally cover open tops of the pockets. The deflector shield includes a front panel adapted to be disposed beneath the front window between the front mounting bracket structure and the front equipment carrying rack, and a second panel disposed at an angle of about 70 degrees relative to the front panel and adapted to be positioned behind the front window. The first panel includes a clamping arrangement for holding a lower end of the front edge of the fabric cover beneath the head lamp. The zipper structure on each side door includes a first zipper engageable along a rear portion of the side door upper portion for enabling entry and exit relative to the cab assembly, and a second zipper engageable along a front portion of the side door upper portion for permitting venting of the cab assembly.

In another aspect of the invention, a removable cab assembly is provided for an all terrain vehicle having front and rear racks, front and rear wheels provided with respective front and rear fenders and a seat located between the front and rear wheels. The cab assembly includes a front mounting bracket structure removably attached to the front rack of the all terrain vehicle. A rear mounting bracket structure is removably attached to the rear rack of the all terrain vehicle. A flexible framework includes a pair of straight, front, flexible, longitudinal frame members removably interconnected by a straight, front, flexible, transverse member, and a pair of straight, rear, flexible, longitudinal frame members removably interconnected by a straight, rear, flexible, transverse member. Each of the front and rear longitudinal frame members has respective front and rear ends. The front ends of the front longitudinal frame members are removably secured to the front mounting bracket structure. The rear ends of the rear longitudinal frame members are removably secured to the rear mounting bracket structure. The rear ends of the front longitudinal frame members are removably joined to the front ends of the rear longitudinal frame members. The assembled framework has a length such that when joined to the front and rear racks, the framework is bendable and assumes a generally semi-circular profile extending above the all terrain vehicle.

A flexible fabric cover has longitudinal side portions removably attached to the front and rear longitudinal frame members. A front edge assembly is coupled to the front rack, and a rear edge is removably coupled to the rear rack. The fabric cover has longitudinal side edges provided with slide tracks extending substantially along entire lengths thereof. The fabric cover is formed with a front window, a rear window and interior and exterior pockets located beneath the rear window. A pair of side doors is removably connected to the fabric cover. Each side door has a generally semi-circular upper section having a side window formed therein and forward and rearward pockets disposed beneath the side window. Each upper section has a periphery provided with slide track and zipper structure cooperable with the slide track on one of fabric cover longitudinal side edges. Each side door also has a lower skirt-shaped portion extending between the front and rear wheels, and having an edge removably secured to the front fender. The fabric cover and side doors when connected together protect the entire body of the driver of the all terrain vehicle. The rear transverse frame member is located directly beneath the back of a driver positioned in the seat of the all terrain vehicle to provide back support. The rearward pockets on each side door are located on interior and exterior surfaces thereof. Each of the side doors can be zipped open along front and rear portions thereof. A deflector shield is removably mounted on the front rack for directing air outside the front window to the inside of the front window.

The invention further contemplates a method of installing a removable cab assembly on an all terrain vehicle having front and rear racks, and front and rear wheels provided with respective front and rear fenders. The method includes the steps of a) removably attaching a front mounting bracket structure to the front rack; b) removably attaching a rear mounting bracket structure to the rear rack; c) providing a flexible framework having front ends and rear ends; d) bending the framework so as to form a generally semi-circular shape; e) removably connecting the front ends of the framework to the front mounting bracket structure and the rear ends of the framework to the rear mounting bracket structure; f) removably connecting a flexible fabric cover having longitudinal side edges and a front window and a rear window to the framework and to the front and rear racks; and g) removably connecting side doors with side windows along the entire length of the fabric cover longitudinal side edges and between the front and rear wheels.

Various other objects, features and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
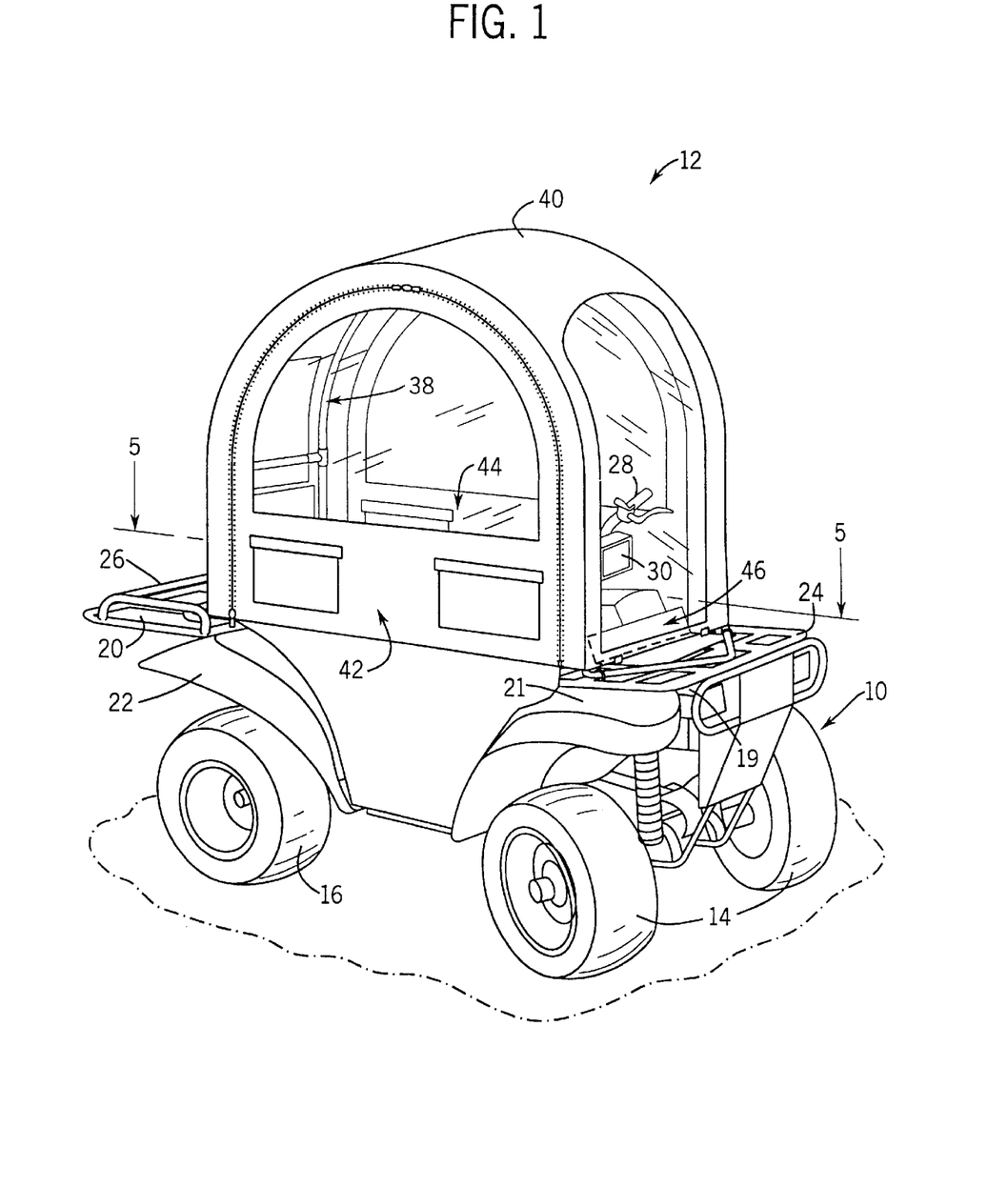
FIG. 1 is a perspective view of an ATV cab assembly embodying the present invention.
Figure 2:
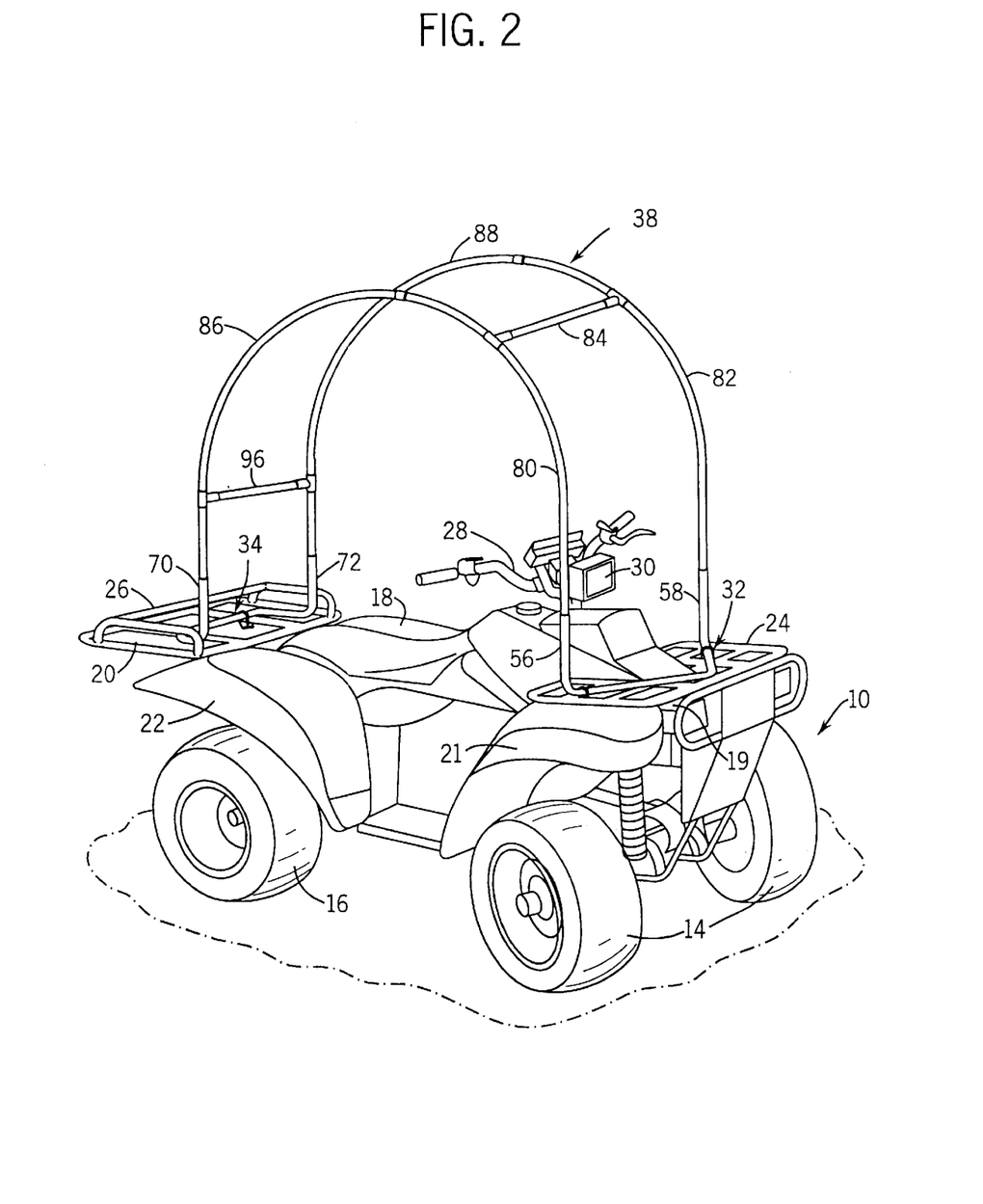
FIG. 2 is a perspective view of the framework for the ATV cab assembly.

Referring now to the drawings, FIG. 1 illustrates an all terrain vehicle (ATV) 10 equipped with a removable cab assembly 12 embodying the present invention. The ATV 10 shown is of the conventional four-wheeled type and may represent either a two-wheel or four-wheel drive version. The ATV 10 includes a pair of front wheels 14 and a pair of rear wheels (one being seen at 16) between which are a motor (not shown) and a seat 18 (FIG. 2). The body of the ATV 10 flares out from respective front and rear decks 19, 20 to form front and rear fenders 21, 22, respectively, over which are mounted respective front and rear equipment carrying racks 24, 26. A handlebar assembly 28 is located forwardly of the seat 18 and includes the normal steering, throttle, brake and other control means normal to the particular type of vehicle. Front and rear racks 24, 26, respectively, are a normal part of the ATV 10 and provide attachment points for the removable cab assembly 12. A headlamp 30 is also typically mounted on the handlebar assembly 28 to illuminate the driving path of the ATV 10 during darkness conditions.

Figure 3:
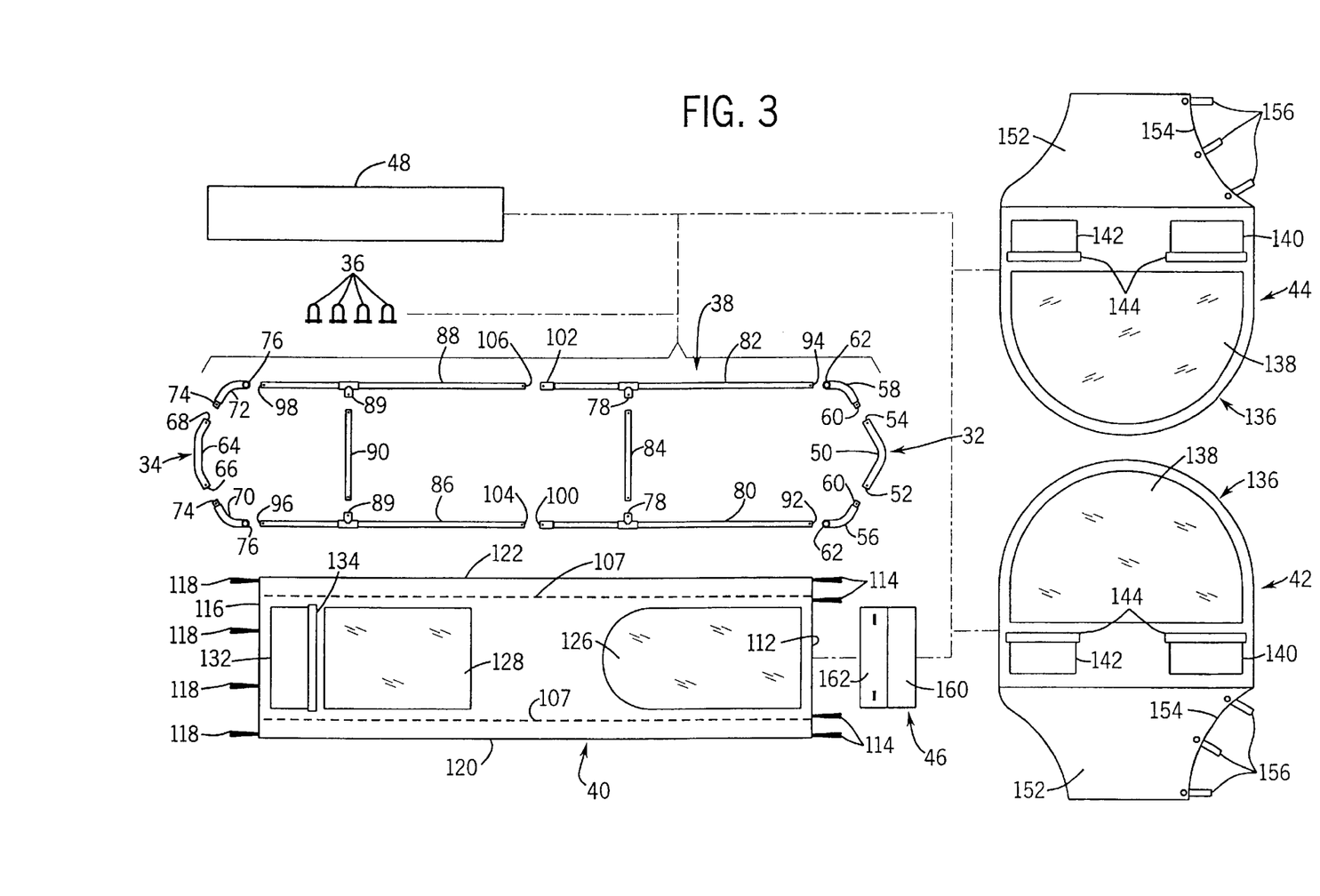
FIG. 3 is a plan view of the components of the ATV cab assembly.

Turning now to FIG. 3, the removable cab assembly 12 is advantageously provided in a portable kit form and shown in a collapsed and disassembled condition. The components of the removable cab assembly 12 include a front mounting bracket structure 32, a rear mounting bracket structure 34, a set of clamps 36 to secure the mounting bracket structures 32, 34 to the front and rear racks 24, 26, respectively, a flexible framework 38, a flexible fabric cover 40, a pair of side doors 42, 44, a deflector shield 46 and a container 48 sized to conveniently hold the aforementioned components, the fabric cover 40 and side doors 42, 44 being suitably rolled up. Such container 48 is preferably a box having typical dimensions of seven inches by eleven inches by forty-five inches.

Front mounting bracket structure 32 includes a central V-shaped, tubular base 50 having opposed ends 52, 54, and a pair of front, upright support posts, 56, 58, each having an inner end 60 which is snap fit into one end 52 or 54 of the V-shaped base 50, and an outer end 62 which is adapted to be coupled to the front of the framework 38. Two of the clamps 36 are used to secure the central V-shaped base 50 with its attached posts 56, 58 to the front rack 24. The base 50 and support posts 56, 58 are preferably made of metal.

Rear mounting bracket structure 34 includes a central, C-shaped, tubular base 64 having opposed ends 66, 68, and a pair of rear curved, upright support posts 70, 72, each having an inner end 74 which is snap fit into one end 66 or 68 of the central C-shaped base 64, and an outer end 76 adapted to be coupled to the rear of the framework 38. The other two of the clamps 36 are used to fasten the central C-shaped base 64 with its attached upright support posts 70, 72 to the rear rack 26. The base 64 and support posts 70, 72 are also normally fabricated from metal.

Flexible framework 38 has a pair of straight, front longitudinal frame members 80, 82 snap fit together at 78 by a front transverse member 84, and a pair of straight, rear longitudinal frame members 86, 88 snap fit together at 89 by a rear transverse member 90. Front ends 92, 94 of the front longitudinal frame members 80, 82 are adapted to be snap fit into outer ends 62 of the front upright support posts 56, 58. Rear ends 96, 98 of the rear longitudinal frame members 86, 88 are adapted to be snap fit into outer ends of the rear upright support posts 70, 72. Rear ends 100, 102 of the front longitudinal frame members 80, 82 are snap fit into front ends 104, 106 of the rear longitudinal frame members 86, 88. All of the framework components are constructed of resilient plastic material which permits the front and rear longitudinal frame members 80, 82, 86, 88, respectively, to assume a rounded or curved profile for a purpose to be understood below.

Figure 4:
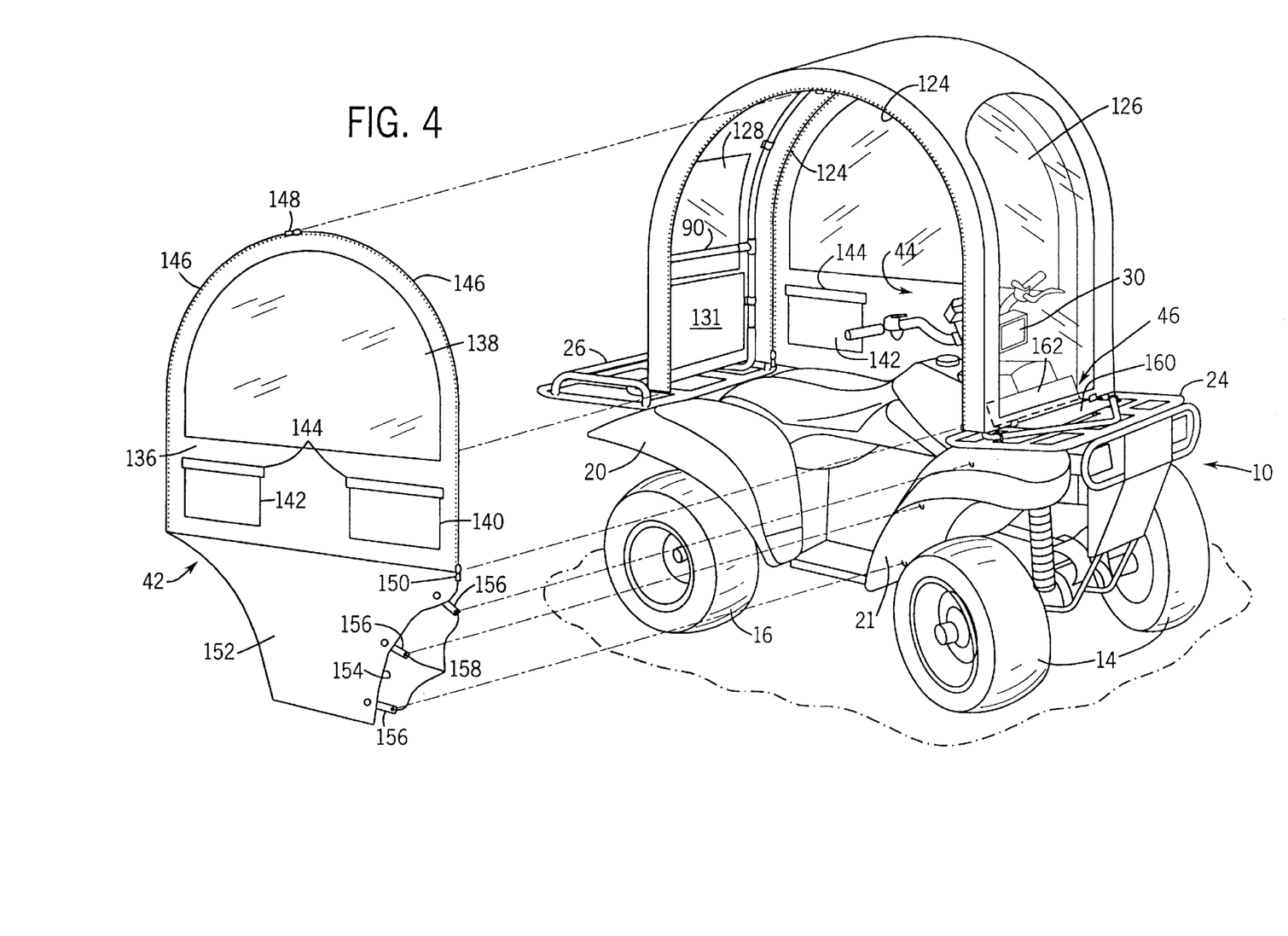
FIG. 4 is a perspective view of the ATV cab assembly showing one of the side doors removed therefrom.

Flexible fabric cover 40 is a generally rectangular piece of canvas material having a width and a length which corresponds generally to the width and the length of the longitudinal frame members 80, 82, 86, 88 connected by the transverse members 84, 90. The fabric cover 40 has longitudinal portions 107 adapted to be removably fastened such as by cooperating hook and loop straps 108, 110 (FIG. 5) to the longitudinal frame members 80, 82, 86, 88. A front edge 112 of cover 40 is removably joined such as by hook and loop straps 114 to front rack 24. A rear edge 116 of cover 40 is likewise detachably fastened, such as by hook and loop straps 118, to rear rack 26. Longitudinal side edges 120, 122 of cover 40 are provided with slide tracks 124 substantially along their entire lengths as best seen in FIG. 4. Cover 40 is integrally formed with a front window 126 and a rear window 128. Front and rear windows 126, 128, respectively have peripheral lips 129, 130 (FIG. 6, 8) to add reinforcement to the windows. As an additional feature, interior and exterior pockets 131, 132, respectively, (FIGS. 4, 5, 6) are provided between the rear window 128 and the rear edge 116. Flap 134 (FIG. 6) is provided at the top end of the pocket 132 to permit and prevent access thereto.

Figure 4A:
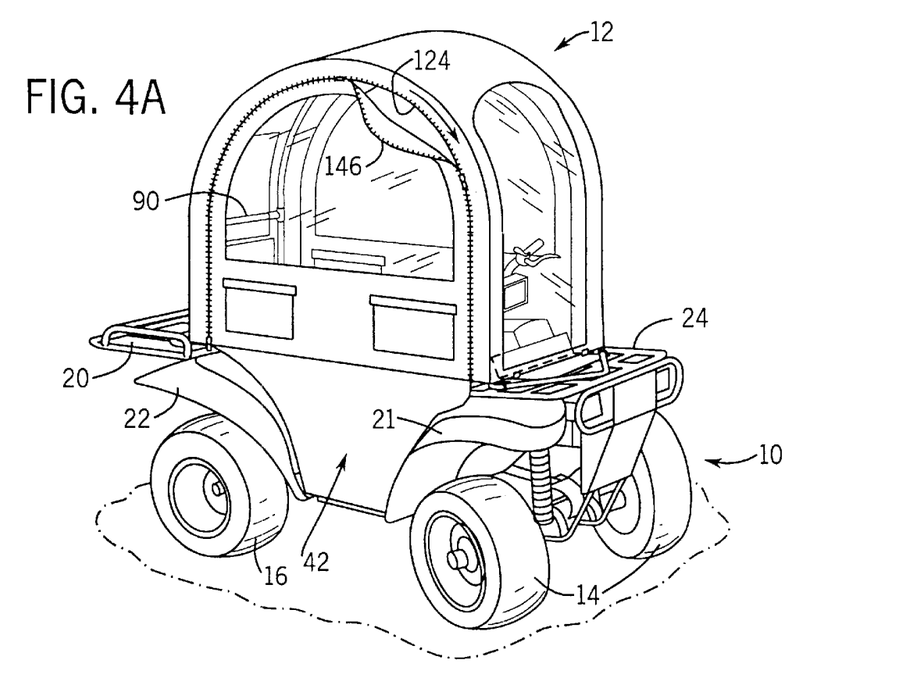
FIG. 4A is a perspective view of the ATV cab showing one of the side doors partially unzipped for ventilation.
Figure 4B:
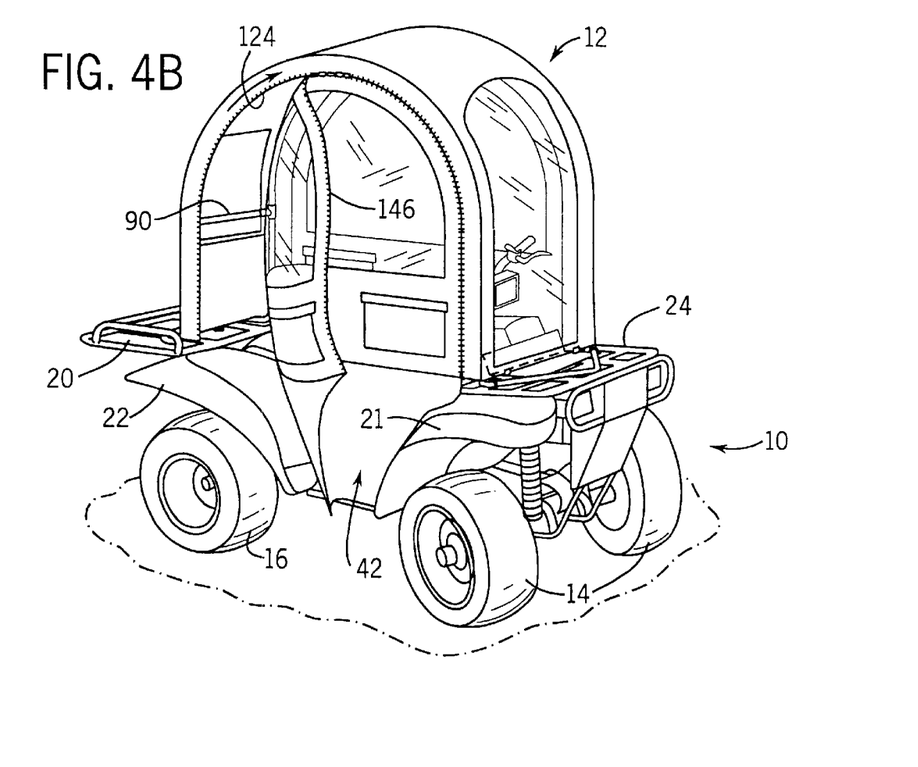
FIG. 4B is perspective view of the ATV cab showing one of the side doors partially unzipped to permit entry/exit to/from the cab assembly.
Figure 5:
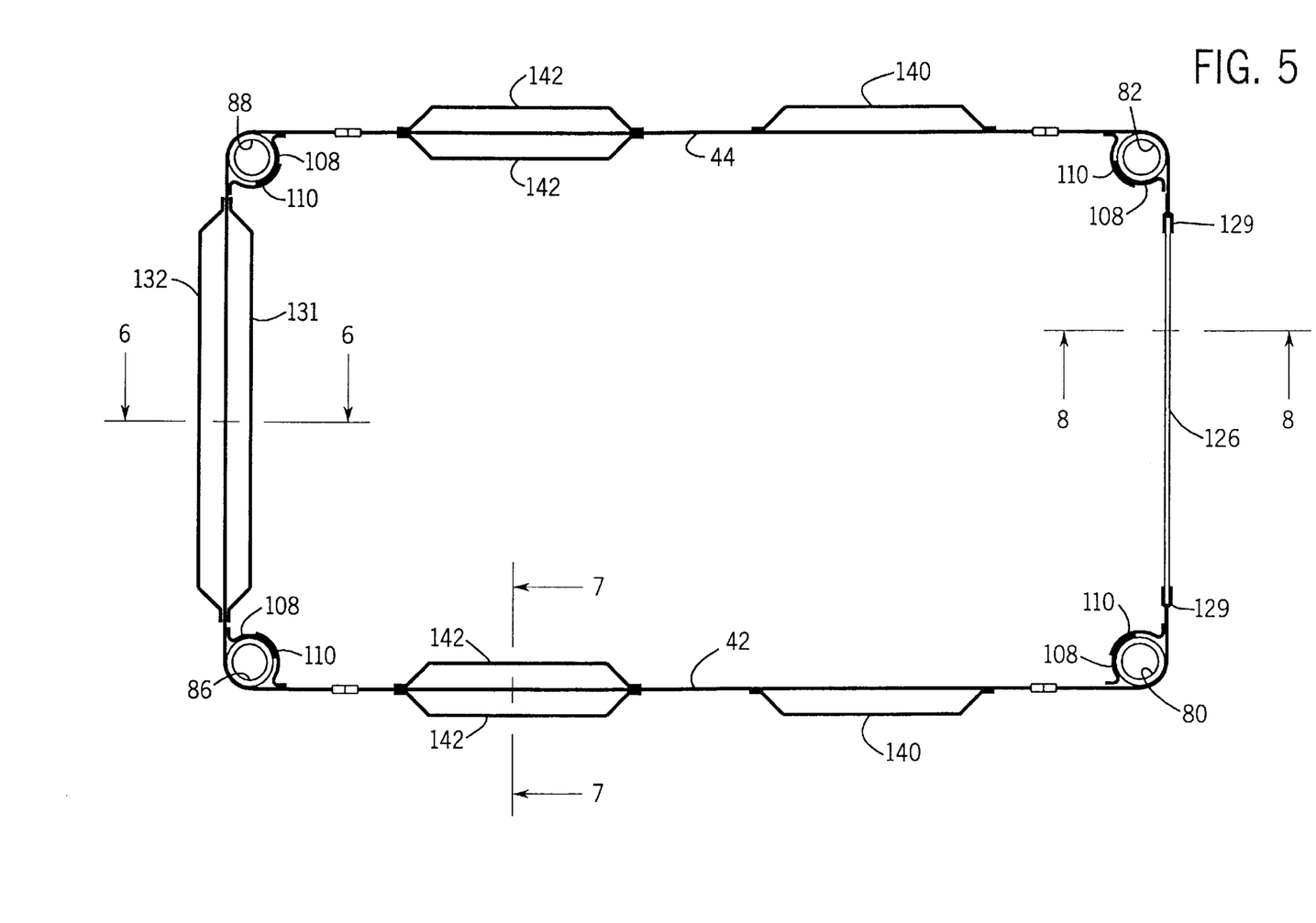
FIG. 5 is a sectional view taken on line 5—5 of FIG. 1.

Side doors 42, 44 are identical and are adapted to be removably secured to the slide tracks 124 on the fabric cover 40. Each side door 42 or 44 has a generally semi-circular upper section 136 including a side window 138 formed therein and forward and rearward pockets 140, 142, respectively, located beneath the side window 138. Each side window 138 is formed with a peripheral lip 143 (FIG. 7) for reinforcement. As seen in FIG. 5, the forward pockets 140 are only formed on the exterior surface of the side doors 42, 44. This is done so as to avoid obstruction of a filled pocket with the wide handlebar assembly 28. In contrast, the rear pockets 142 (FIG. 7) are formed on both the interior and exterior surfaces of the side doors 42, 44. Flaps 144 as seen in FIG. 4 are provided on each of the pockets 140, 142. Each upper section 136 is provided along its periphery with a slide track and zipper structure 146 which cooperates with the slide track 124 on fabric cover 40. As best seen in FIG. 4, the fastening structure 124 includes two zippers 148, 150. One zipper 148 moves between the bottom rear edge of the upper section 136, and the top of the upper section 136, and is used to permit entry to and exit from the interior of the cab assembly 12 (FIG. 4B). The other zipper 150 moves between the top of the upper section 136, and the bottom front edge of the upper section 136 and is used to ventilate the interior of the cab assembly 12 (FIG. 4A). Each side door 42 or 44 also has a generally trapezoidal or skirt shaped lower section 152 having a front edge 154 provided with straps 156 which are removably attached, such as by snaps 158 (FIG. 4), to attachment points on the front fender 21. The lower sections 152 of the side doors 42, 44 are intended to protect the lower half of the driver from the outside elements.

Figures 6, 7, 8:
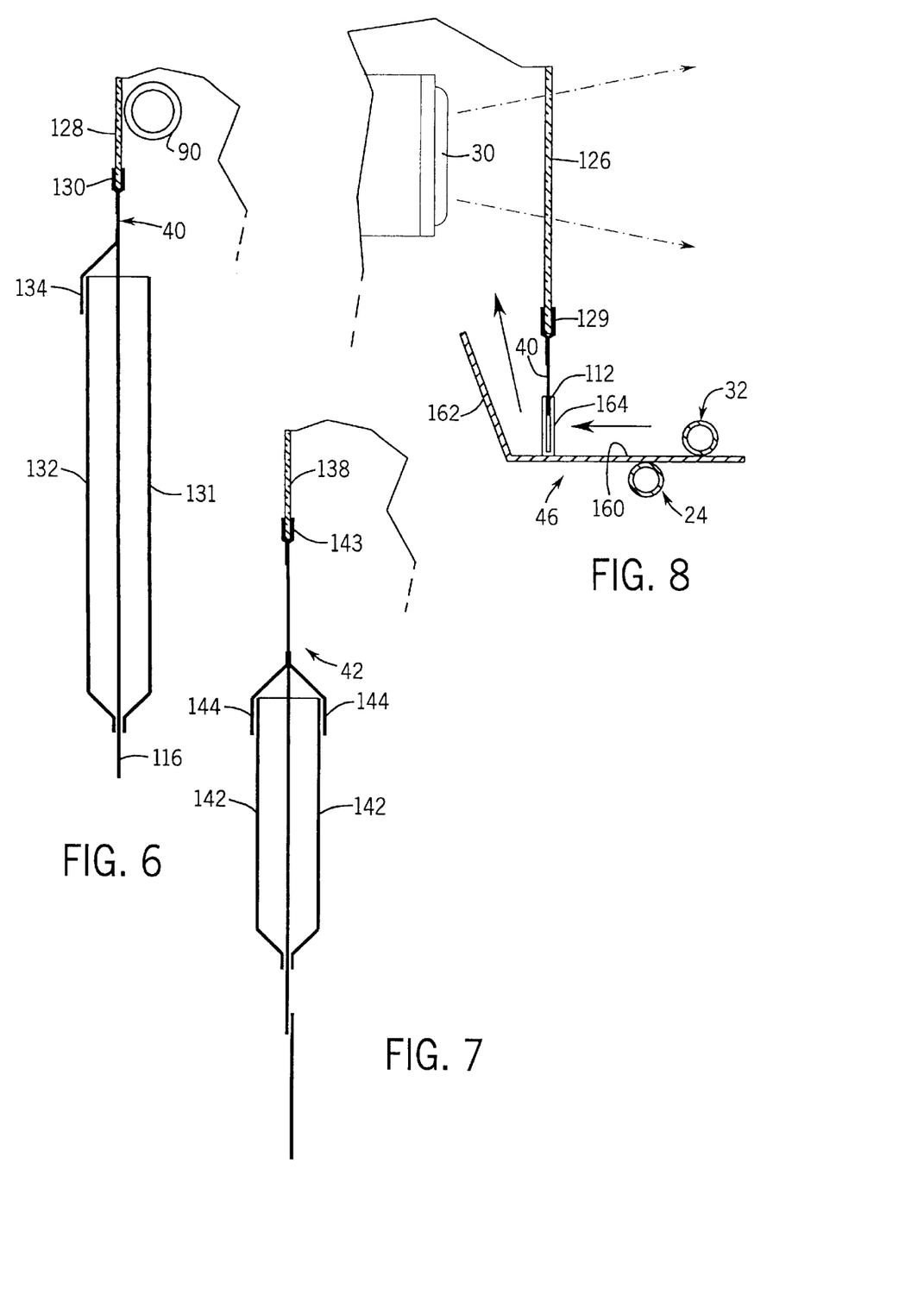
FIG. 6 is a sectional view taken on line 6—6 of FIG. 5.
FIG. 7 is a sectional view taken on line 7—7 of FIG. 5.
FIG. 8 is a sectional view taken on line 8—8 of FIG. 5.

The deflector shield 46 is adapted to be removably connected to the front rack 24 for advantageously directing outside air to the interior face of the front window 126. The deflector shield 46 has a first panel 160 adapted to be disposed beneath the front window 126 between the front mounting bracket structure 32 and the front rack 24. A second panel 162 integral with first panel 160 is disposed at an angle of about 70 degrees relative to the front panel 160 and is adapted to be positioned behind the front window 126. First panel 160 includes a clamping arrangement 164 (FIG. 8) for holding the front edge 112 of the fabric cover 40 which is attached to a peripheral lip 129 surrounding the front window 126. Its to be noted that the headlamp 30 on some ATVs 10 is located at different heights. With the foregoing structure, the front window 126 may be suitably positioned so that the headlamp 30 will always shine unobstructedly therethrough as shown in FIG. 8.

To add the cab assembly 12 on the ATV 10, the front ends 92, 94 of the flexible framework 38 are snap fit into outer ends 62 of the front upright support posts 56, 58. Bending the framework 38, the rear ends 96, 98 are snap fit into the outer ends 76 of the rear upright support posts, 70, 72. The framework 38 has a length such that when interconnected to the front and rear mounting bracket structures 32, 34, the framework 38 assumes a curved or semi-circular side profile extending above the ATV 10 (FIG. 2). The fabric cover 40 may then be attached to the framework 38 and racks 24, 26 using hook and loop straps 108, 110, 114, 118. Next, the side doors 42, 44 are attached by the slide track and zipper structure 146 to the slide tracks 124 of the fabric cover 40. Finally, the deflector shield 46 is fastened in place by suitable connectors (not shown) between the front rack 24 and front mounting bracket structure 32 so that the angular second panel 162 is located inside the front window 126.

Removal of the cab assembly 12 proceeds in a manner opposite to that described above with the understanding that the front and rear mounting bracket structures 32, 34 remain in place to permit installation of the cab assembly 12 at another time.

It should be appreciated that when the fabric cover 40 is attached to the flexible framework 38, there is provided a rounded roof structure which will not accumulate snow, rain, ice, branches or the like which could otherwise affect the structural integrity of the cab assembly 12. By unzipping the rear portion of either side door 42, 44 and noting that the rear edge of the lower section 152 is unattached, entry to and exit from the interior of the cab assembly 12 is made easy as depicted in FIG. 4B. By unzipping the front portion of either or both side doors 42, 44, (FIG. 4A) the driver may add ventilation to the interior of the cab assembly 12 which adds to the ventilation provided by the deflector shield 46. Such ventilation is vastly improved over vent holes previously formed in the fabric cover 40. As previously noted, the rear traverse member 90 is positioned behind the driver to serve as a back support. The addition of interior and exterior pockets 131, 132, 140, 142 provides storage space previously not seen on removable ATV cabs. A provision is also made to ensure that the headlamp 30 shines through the front window 126.

While the invention has been described with reference to a preferred embodiment, those skilled in the art will appreciate that certain substitutions, alterations and omissions may be made without departing from the spirit thereof. Accordingly, the foregoing description is meant to be exemplary only and it should not be deemed limitative on the scope of the invention as set forth with the following claims.

I claim:

1. A kit providing a portable, removable cab assembly for an all terrain vehicle having front and rear equipment carrying racks, a headlamp and front and rear wheels provided with respective front and rear fenders, the kit comprising the following components;

a front mounting bracket structure adapted to be attached by a front clamping arrangement to the front equipment carrying rack;

a rear mounting bracket structure adapted to be attached by a rear clamping arrangement to the rear equipment carrying rack;

a flexible framework including a pair of front, flexible, longitudinal frame members adapted to be removably interconnected by a front, flexible transverse member, and a pair of rear flexible longitudinal frame members adapted to be removably interconnected by a rear, flexible transverse member, each of the front and rear longitudinal frame members having respective front and rear ends, the front ends of the front longitudinal frame members adapted to be removably connected to the front mounting bracket structure, the rear ends of the rear longitudinal frame members adapted to be removably connected to the rear mounting bracket structure and the rear ends of the front longitudinal frame members adapted to be removably joined to the front ends of the rear longitudinal frame members, the framework adapted to assume a curved profile extending above the vehicle when interconnected to the front and rear mounting bracket structures;

a generally rectangular, flexible fabric cover having longitudinal portions adapted to be removably attached to the front and rear longitudinal frame members, a front edge adapted to be removably attached to the front equipment carrying rack and a rear edge adapted to be removably secured to the rear equipment carrying rack, the fabric cover having longitudinal side edges provided with first slide tracks substantially along their entire lengths, the fabric cover being integrally formed with a front window and a rear window and interior and exterior pockets located beneath the rear window;

a pair of side doors adapted to be removably connected to the fabric cover, each side door having a generally semi-circular upper section including a side window formed therein and forward and rearward pockets disposed beneath the side window, each upper section having a periphery provided with a second slide track and zipper structure adapted to engage the first slide track on one of the fabric cover longitudinal side edges, each side door also having a generally trapezoidal lower section having an edge adapted to be removably secured to the front fender; and a deflector shield adapted to be removably connected to the front equipment carrying rack for directing outside air to an interior surface of the front window.

2. The kit of claim 1, wherein the front mounting bracket structure includes a central V-shaped tubular base having opposed ends, and a pair of front upright support posts, each adapted to be connected to one end of the base.

3. The kit of claim 1, wherein the rear mounting bracket structure includes a central curved C-shaped base having opposed ends, and a pair of rear upright support posts, each being adapted to be connected to one end of the base.

4. The kit of claim 1, wherein the front and rear longitudinal frame members and the front and rear transverse members are constructed of resilient plastic material.

5. The kit of claim 1, wherein longitudinal side portions of the fabric cover are provided with hook and loop straps adapted to be engaged with front and rear longitudinal frame members.

6. The kit of claim 1, wherein the front and rear edges of the fabric covers are provided with hook and loop straps adapted to be engaged with the front and rear equipment carrying racks, respectively.

7. The kit of claim 1, wherein forward pockets on the side doors are located on exterior surfaces thereof, and the rearward pockets on the side doors are located on exterior and interior surfaces thereof.

8. The kit of claim 1, wherein pockets on the fabric cover and the pockets on the side doors are provided with flaps to normally cover open tops of the pockets.

9. The kit of claim 1, wherein the deflector shield includes a first panel adapted to be disposed beneath the front window between the front mounting bracket structure and the front equipment carrying rack, and a second panel integral with the first panel disposed at an angle of about 70 degrees relative to the first panel and adapted to be positioned behind the front window.

10. The kit of claim 9, wherein the first panel includes a clamping arrangement for holding a lower end of the front edge of the fabric cover beneath the headlamp.

11. The kit of claim 1, wherein the zipper structure on each side door includes a first zipper engageable along a rear portion of the side door upper portion for enabling entry and exit relative to the cab assembly, and a second zipper engageable along a front portion of the side door upper portion for permitting venting of the cab assembly.

12. A removable cab assembly for an all terrain vehicle having front and rear racks, front and rear wheels provided with respective front and rear fenders, and a seat located between the front and rear wheels, the cab assembly comprising:

a front mounting bracket structure removably attached to the front rack of the all terrain vehicle;

a rear mounting bracket structure removably attached to the rear rack of the all terrain vehicle;

a flexible framework including a pair of straight, front, flexible, longitudinal frame members removably interconnected by a straight, front, flexible transverse member, and a pair of straight, rear, flexible longitudinal frame members removably interconnected by a straight, rear, flexible transverse member, each of the front and rear longitudinal frame members having respective front and rear ends, the front ends of the front longitudinal frame members being removably secured to the front mounting bracket structure, the rear ends of the rear longitudinal frame members being removably secured to the rear mounting bracket structure, and the rear ends of the front longitudinal frame members being removably secured to the front ends of the rear longitudinal frame members, the assembled framework having a length such that when joined to the front and rear racks, the framework is bendable and assumes a generally semi-circular profile extending above the all terrain vehicle;

a flexible fabric cover having longitudinal side portions removably attached to the front and rear longitudinal frame members, a front edge removably coupled to the front rack, and a rear edge removably coupled to the rear rack, the fabric cover having longitudinal side edges provided with slide tracks extending substantially along entire lengths thereof, the fabric cover being formed with a front window, a rear window and interior and exterior pockets located beneath the rear window;

a pair of side doors removably connected to the fabric cover, each side door having a generally semi-circular upper section having a side window formed therein and forward and rearward pockets disposed beneath the side window, each upper section having a periphery provided with slide track and zipper structure cooperable with the slide track on one of the fabric cover longitudinal side edges, each side door also having a lower skirt-shaped portion extending between the front and rear wheels, and having an edge removably secured to the front fender, the fabric cover and side doors when connected together protecting the entire body of the all terrain vehicle.

13. The removable cab assembly of claim 12, wherein the rear transverse frame member is located directly beneath the back of a driver positioned in the seat of an all terrain vehicle to provide back support.

14. The removable cab assembly of claim 12, wherein the rearward pockets on each side door are located on interior and exterior surfaces thereof.

15. The removable cab assembly of claim 12, wherein each of the side doors are zipped open along front and rear portions thereof.

16. The removable cab assembly of claim 12, including a deflector shield removably mounted on the front rack for directing air outside the front window to the inside of the front window.

* * * * *